US012691433B2

(12) United States Patent
Pang et al.

(10) Patent No.: US 12,691,433 B2
(45) Date of Patent: Jul. 28, 2026

(54) SUPPORT-FREE ADSORBENTS FOR CO₂ CAPTURE FROM AIR

(71) Applicant: Lawrence Livermore National Security, LLC, Livermore, CA (US)

(72) Inventors: Simon Hoching Pang, Fremont, CA (US); Melinda Lia Wah Jue, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 395 days.

(21) Appl. No.: 18/376,390

(22) Filed: Oct. 3, 2023

(65) Prior Publication Data

US 2024/0024850 A1      Jan. 25, 2024

Related U.S. Application Data

(62) Division of application No. 17/368,598, filed on Jul. 6, 2021, now Pat. No. 11,813,582.

(60) Provisional application No. 63/052,365, filed on Jul. 15, 2020.

(51) Int. Cl.
| | |
|---|---|
| *B01J 20/26* | (2006.01) |
| *B01D 53/62* | (2006.01) |
| *B01D 53/81* | (2006.01) |
| *B01D 53/96* | (2006.01) |
| *B01J 20/28* | (2006.01) |
| *B01J 20/30* | (2006.01) |
| *B01J 20/34* | (2006.01) |
| *C01B 32/50* | (2017.01) |

(52) U.S. Cl.
CPC ............ *B01J 20/267* (2013.01); *B01D 53/62* (2013.01); *B01D 53/81* (2013.01); *B01D 53/96* (2013.01); *B01J 20/28033* (2013.01);

*B01J 20/3064* (2013.01); *B01J 20/3085* (2013.01); *B01J 20/3425* (2013.01); *B01J 20/3483* (2013.01); *B01J 20/3491* (2013.01); *C01B 32/50* (2017.08); *B01D 2253/202* (2013.01); *B01D 2253/34* (2013.01); *B01D 2257/504* (2013.01); *C01B 2210/0007* (2013.01)

(58) Field of Classification Search
None
See application file for complete search history.

(56) References Cited

U.S. PATENT DOCUMENTS

| | | | |
|---|---|---|---|
| 8,088,197 B2 | 1/2012 | Wright et al. |
| 8,377,173 B2 | 2/2013 | Chuang |
| 8,470,074 B2 | 6/2013 | Baugh et al. |
| 9,169,370 B2 | 10/2015 | Peiffer et al. |
| 9,227,153 B2 | 1/2016 | Eisenberger |

(Continued)

FOREIGN PATENT DOCUMENTS

| | | |
|---|---|---|
| CN | 110368904 A | 10/2019 |
| WO | 2011103529 A1 | 8/2011 |

OTHER PUBLICATIONS

Extended European Search Report from European Application No. 21843244.1, dated Dec. 6, 2024, 12 pages.

(Continued)

*Primary Examiner* — Daniel Berns

(74) *Attorney, Agent, or Firm* — Zilka-Kotab, P.C.

(57) ABSTRACT

A product includes an aminopolymer material formed into a self-supporting structure, the aminopolymer material including crosslinked aminopolymers having amine sites for the capture of carbon dioxide molecules.

16 Claims, 7 Drawing Sheets

400

Form a structure using a resin, the resin comprising a functionalized aminopolymer having the amine sites for capturing carbon dioxide molecules from a source gas and at least one functional group amenable to crosslinking — 402

Cause crosslinking of the functionalized aminopolymer to form the aminopolymer material having amine sites for capturing carbon dioxide into the self-supporting structure — 404

(56)            References Cited

U.S. PATENT DOCUMENTS

| 11,813,582 | B2 | 11/2023 | Pang et al. |
| 2001/0043881 | A1 | 11/2001 | Wagner et al. |
| 2011/0226697 | A1 | 9/2011 | McLellan et al. |
| 2012/0164044 | A1 | 6/2012 | Peiffer et al. |
| 2012/0164045 | A1 | 6/2012 | Peiffer et al. |
| 2019/0160451 | A1 | 5/2019 | Nabavi et al. |
| 2019/0291077 | A1 | 9/2019 | Pang et al. |
| 2022/0016598 | A1 | 1/2022 | Pang et al. |
| 2022/0064427 | A1 | 3/2022 | Oakdale et al. |

OTHER PUBLICATIONS

Keith et al., "A Process for Capturing CO2 from the Atmosphere," Joule, Aug. 15, 2018, pp. 1573-1594.

Pang et al., "Design of Aminopolymer Structure to Enhance Performance and Stability of CO2 Sorbents: Poly(propylenimine) vs Poly(ethylenimine)," Journal of the American Society, vol. 139, 2017, pp. 3627-3630.

The National Academies Press, "Negative Emissions Technologies and Reliable Sequestration: A Research Agenda," National Academies of Sciences, Engineering, and Medicine, 2018, 510 pages, retrieved from https://www.hcbi.nlm.nih.gov/books/NBK541442/.

Hamdy et al., "Epoxy Cross-Linked Polyamine CO2 Sorbents Enhanced via Hydrophobic Functionalization," Chemistry of Materials, 2019, 12 pages.

Xu et al., Polyethylenimine "Snow": An Emerging Material for Efficient Carbon Removal, Applied Materials & Interfaces, vol. 11, 2019, pp. 26770-26780.

Andreoli et al., "Cross-Linking Amine-Rich Compounds into High Performing Selective CO2 Absorbents," Scientific Reports, vol. 4:7304, 2014, pp. 1-5.

Wang et al., "Support-Free Porous Polyamine Particles for CO2 Capture," ACS Macro Letters, 2012, pp. 944-948.

Xu et al., "Fabrication of Cross-Linked Polyethyleneimine Microfibers by Reactive Electrospinning with In Situ Photo-Cross-Linking by UV Radiation," Biomacromolecules, vol. 11, 2010, pp. 2283-2289.

Xu et al., "Carbon capture with polyethylenimine hydrogel beads (PEI HBs)," Journal of Materials Chemistry A, vol. 6, 2018, pp. 21468-21474.

Yoo et al., "Self-supported branched poly(ethyleneimine) materials for CO2 adsorption from simulated flue gas," Journal of Materials Chemistry A, vol. 7, 2019, pp. 19513-19521.

International Search Report and Written Opinion from PCT Application No. PCT/US2021/040867, dated Oct. 26, 2021.

International Preliminary Examination Report from PCT Application No. PCT/US2021/040867, dated Jan. 17, 2023.

Non-Final Office Action from U.S. Appl. No. 17/368,598, dated Dec. 9, 2022.

Notice of Allowance from U.S. Appl. No. 17/368,598, dated Jul. 12, 2023.

Restriction Requirement from U.S. Appl. No. 17/368,598, dated Sep. 22, 2022.

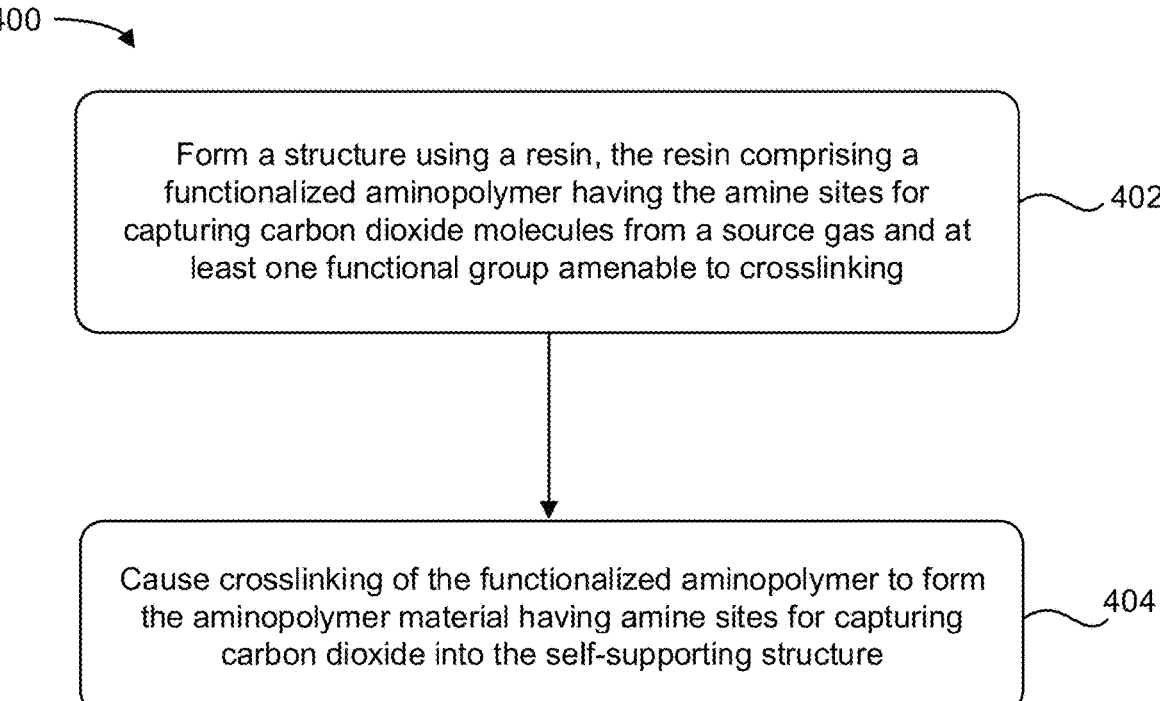

400

Form a structure using a resin, the resin comprising a functionalized aminopolymer having the amine sites for capturing carbon dioxide molecules from a source gas and at least one functional group amenable to crosslinking　402

Cause crosslinking of the functionalized aminopolymer to form the aminopolymer material having amine sites for capturing carbon dioxide into the self-supporting structure　404

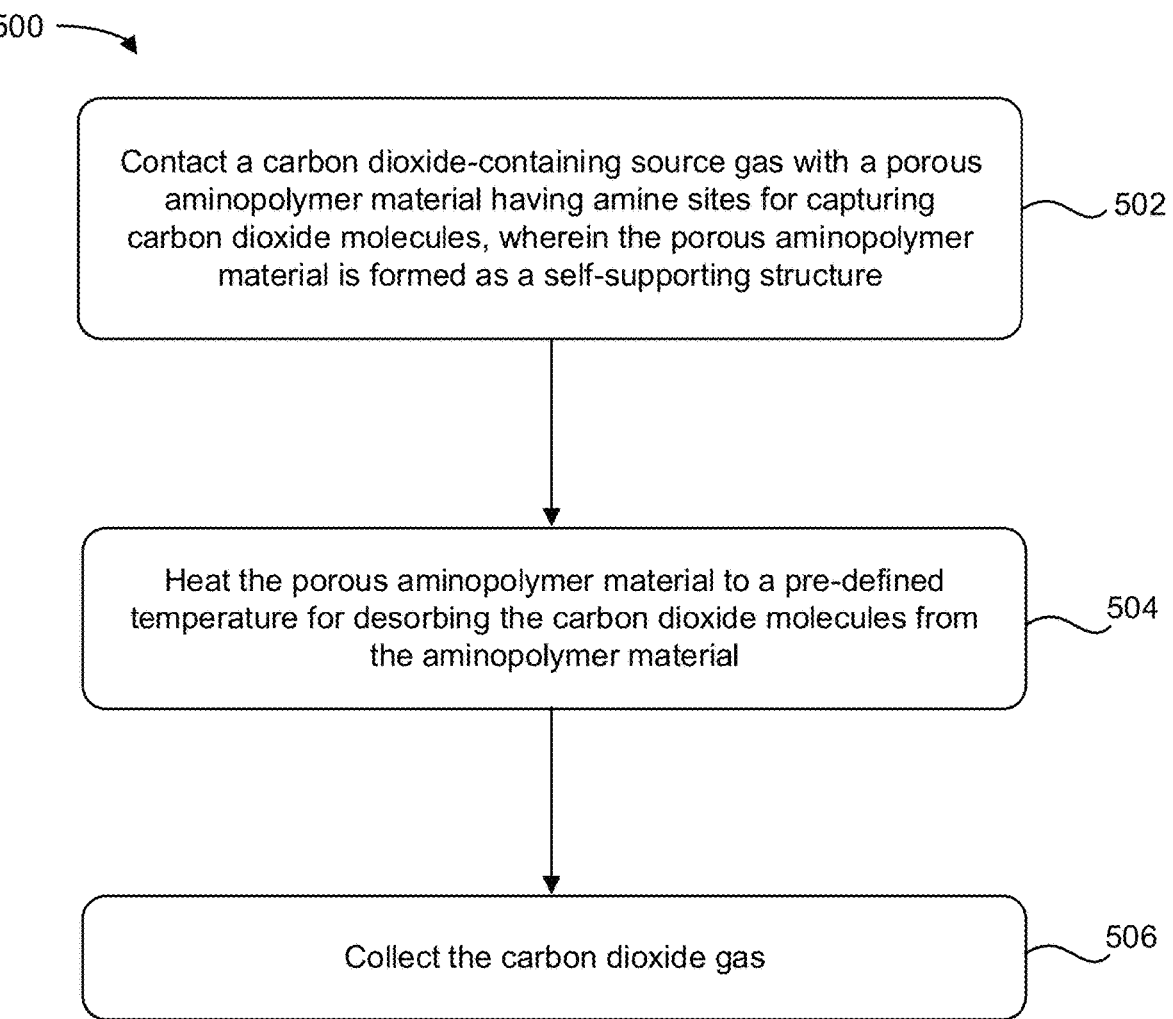

Contact a carbon dioxide-containing source gas with a porous aminopolymer material having amine sites for capturing carbon dioxide molecules, wherein the porous aminopolymer material is formed as a self-supporting structure — 502

Heat the porous aminopolymer material to a pre-defined temperature for desorbing the carbon dioxide molecules from the aminopolymer material — 504

Collect the carbon dioxide gas — 506

FIG. 5

SUPPORT-FREE ADSORBENTS FOR CO2 CAPTURE FROM AIR

RELATED APPLICATIONS

This application is a divisional application of U.S. patent application Ser. No. 17/368,598 filed on Jul. 6, 2021, which claims priority to U.S. Provisional Patent Application No. 63/052,365 filed Jul. 15, 2020. This application claims priority to the foregoing applications, each of which is also hereby incorporated by reference.

This invention was made with Government support under Contract No. DE-AC52-07NA27344 awarded by the United States Department of Energy. The Government has certain rights in the invention.

FIELD OF THE INVENTION

The present invention relates to carbon dioxide capture, and more particularly to support-free adsorbents for carbon dioxide capture from a source gas, and methods of making and using the same.

BACKGROUND

It has become increasingly apparent that to achieve net-zero carbon dioxide ($CO_2$) emissions in the coming decades, technologies that remove $CO_2$ from the air and ocean will be needed to account for sectors of industry and transportation that cannot be easily decarbonized. Engineered capture of $CO_2$ from the air, termed Direct Air Capture (DAC), with permanent sequestration can remove carbon at the same rate as trees, but with an order of magnitude less land and water requirement.

Direct air capture is currently deployed at the pilot-scale using two types of processes to capture the $CO_2$: (1) aqueous hydroxide solutions and (2) solid supported amine adsorbents. The former generates solids that must be calcined above 900° C. to regenerate the material and release the $CO_2$ for sequestration. The latter can perform regeneration around 100° C., potentially allowing waste heat sources to be used to perform carbon capture. However, each of these processes require high temperatures and a large amount of material. Thus, it is highly desirable to develop new materials and processes for DAC for increased energy efficiency.

The materials used in current solid adsorbent processes have two primary components: a liquid amine with high $CO_2$ affinity and a high surface area porous material that physically supports the amine. These support materials contribute over half of the mass of the total adsorbent yet have negligible $CO_2$ capture capacity themselves. The mass of the support materials reduces the total capacity of the solid adsorbent process available for $CO_2$ capture, as well as increases the sensible heat required to release the $CO_2$. Moreover, solid adsorbent material including the inert support needs to be regenerated, e.g., to release the captured $CO_2$, more frequently due to the limited space available for $CO_2$ capture because the presence of the inert support material. Thus, it would be desirable to minimize the contribution of added support material to the solid adsorbent processes in order to save energy in the system.

Conventional adsorbent materials for solid adsorbent processes, particularly in the case of capture from air, are either solid powders (e.g., metal-organic frameworks, zeolites, some polymers) or liquid amines/aminopolymers that are supported on an inert material. Typically, commercially available liquid amines are mixed with an inert material with high surface area (such as an oxide monolith) for physically supporting the amine. The structured material facilitates contact between the amine and the air to allow rapid capture of $CO_2$ while minimizing parameters such as loss of adsorptive material or the energy required to process a high flow rate of air.

It would be desirable to have a solid adsorbent material that does not require these inert support materials. Moreover, it would be desirable for a solid adsorbent support material to have high surface area, a high density of $CO_2$-capturing sites, and be able to be structured in a way to facilitate contact between the material and the $CO_2$-containing gas, while being able to withstand the temperature, pressure, and flow rate requirements for various $CO_2$ capture processes.

SUMMARY

In one inventive aspect, a product includes an aminopolymer material formed into a self-supporting structure, the aminopolymer material including crosslinked aminopolymers having amine sites for the capture of carbon dioxide molecules.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a structure of proposed polymer that may be functionalized for crosslinking, according to one inventive aspect.

FIG. 2B depicts a schematic diagram of proposed methacrylamide functionalization and polymerization chemistry to form a self-supporting adsorbent structure, according to one inventive aspect.

FIG. 2C is a structure of a crosslinked polymer that would form a self-supporting adsorbent structure, according to one inventive aspect.

FIG. 4 is a flow chart of the method of making a product, according to one inventive aspect.

FIG. 5 is a flow chart of a method of using a functionalized aminopolymer formed as a self-supporting structure for capturing carbon dioxide gas, according to one inventive aspect.

DETAILED DESCRIPTION

Figure 1:
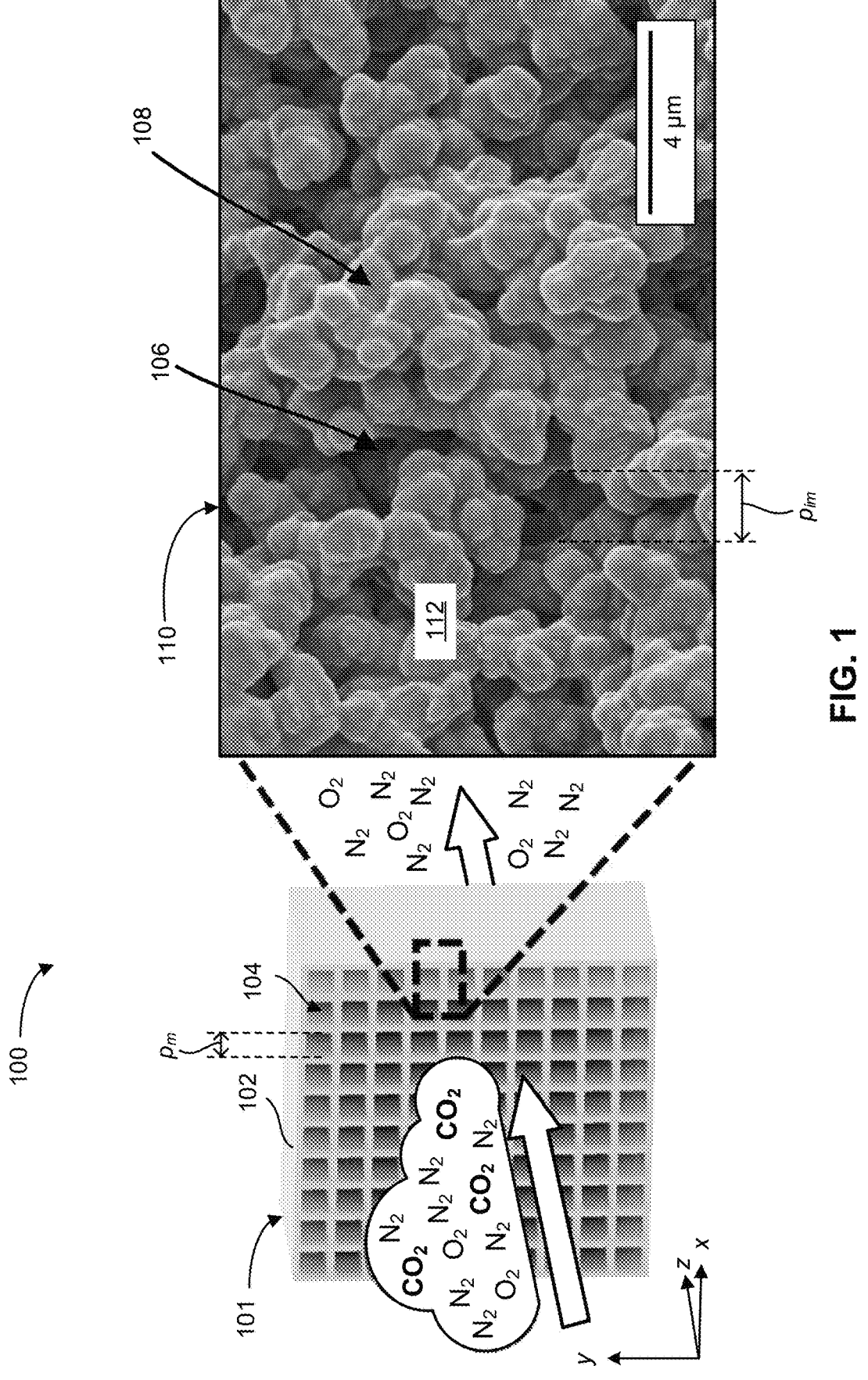
FIG. 1 is a schematic drawing of a self-supporting monolith with hierarchical pores and submicron features, according to one inventive aspect.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Further, as used herein, all percentage values are to be understood as percentage by weight (wt. %), unless otherwise noted. Moreover, all percentages by weight are to be understood as disclosed in an amount relative to the bulk weight of the material being described in association therewith, in various approaches.

Unless expressly defined otherwise herein, each component listed in a particular approach may be present in an effective amount. An effective amount of a component means that enough of the component is present to result in a discernable change in a target characteristic of the intermediary and/or final product in which the component is present, and preferably results in a change of the characteristic to within a desired range. One skilled in the art, now armed with the teachings herein, would be able to readily determine an effective amount of a particular component without having to resort to undue experimentation.

As also used herein, the term "about" when combined with a value refers to plus and minus 10% of the reference value. For example, a length of about 10 nm refers to a length of 10 nm±1 nm, a temperature of about 50° C. refers to a temperature of 50° C.±5° C., etc.

The description herein is presented to enable any person skilled in the art to make and use the invention and is provided in the context of particular applications of the invention and their requirements. Various modifications to the disclosed aspects of the invention will be readily apparent to those skilled in the art upon reading the present disclosure, including combining features from various aspects to create additional and/or alternative aspects of the invention thereof.

Moreover, the general principles defined herein may be applied to other aspects of the invention and applications without departing from the spirit and scope of the present invention. Thus, the present invention is not intended to be limited to the approaches shown but is to be accorded the widest scope consistent with the principles and features disclosed herein.

The following description discloses several preferred inventive aspects of a self-supporting functionalized aminopolymer material for capturing carbon dioxide gas and/or related systems and methods.

In one general inventive aspect, a resin includes a functionalized aminopolymer having amine sites for capturing carbon dioxide molecules, where each aminopolymer molecule has at least one functional group amenable to crosslinking, a porogen, and a crosslinking initiator.

In another general inventive aspect, a product includes an aminopolymer material formed into a self-supporting structure, the aminopolymer material including crosslinked aminopolymers having amine sites for the capture of carbon dioxide molecules.

In yet another general inventive aspect, a method of using an aminopolymer material formed as a self-supporting structure for capturing carbon dioxide gas includes contacting a carbon dioxide-containing source gas with a porous aminopolymer material having amine sites for capturing carbon dioxide molecules, heating the porous aminopolymer material to a pre-defined temperature for desorbing the carbon dioxide molecules from the porous aminopolymer material, and collecting the carbon dioxide gas. In addition, the porous aminopolymer material is formed as the self-supporting structure.

A list of acronyms used in the description is provided below.

| 3D | three-dimensional |
|---|---|
| C. | Celsius |
| $CO_2$ | carbon dioxide |
| Da | dalton |
| DAC | Direct Air Capture |
| kDa | kilodalton |
| kg | kilogram |
| mm | millimeter |
| PEI | poly(ethylenimine) |
| SEM | scanning electron microscopy |
| UV | ultraviolet |

According to various aspects of the invention, a product includes a new class of self-supporting material for capturing carbon dioxide from a gas stream. A new material for capturing carbon dioxide from air disclosed herein provides a vast improvement over known solid capture materials because removal of the inert support material from solid adsorbent processes intensifies the DAC process by increasing, and potentially at least doubling, the capture capacity as well as significantly reducing the overall cost of $CO_2$ capture by reducing both the capital and operating cost.

Carbon dioxide captured from air using the material disclosed herein may be reversible so that the material can be regenerated, and at the same time release a high purity stream of $CO_2$ that can be utilized or permanently sequestered.

Prior contemplated studies have demonstrated crosslinking amine-dense polymers with difunctional molecules such as diepoxide results in a polymer in a powder form that cannot be dissolved or reshaped, and thus in a form that is not desirable for forming a self-supporting structure having a useful volume. In contrast, inventive aspects described herein use a resin in a liquid form to create solid, porous, self-supporting structures that are not a powder.

According to various inventive aspects, self-supporting amine-rich materials are described for intensification of $CO_2$ direct air capture processes. Materials for direct air capture thus far have relied on inclusion of a supporting material for the active amine component. This support material does not participate in $CO_2$ capture, but reduces the total amount of material that is available for capture, and increases the sensible heat required to release the $CO_2$ to allow reuse of the material.

According to various inventive aspects described herein, an aminopolymer material for $CO_2$ capture from air is formed as a self-supporting structure, has a high surface area, has a high density of amine sites for high $CO_2$ capacity, and has a porosity that minimizes the critical dimension for mass transfer to allow rapid $CO_2$ uptake. The material, in each of its many potential compositions, includes a self-supporting structure of crosslinked polymers, the polymers having amine sites (i.e., aminopolymers) that capture carbon dioxide. According to various aspects, a resin is disclosed for forming the self-supporting structure, where the resin includes functionalized aminopolymer with amine sites for capturing $CO_2$ and functional groups amenable to crosslinking. Moreover, a preferred aspect discloses the process of synthesizing a functionalized aminopolymer amenable for crosslinking.

A Self-Supporting Aminopolymer Structure for Capturing $CO_2$

In various aspects, the material for capturing carbon dioxide includes a self-supporting structure of crosslinked polymers. In some approaches, a self-supporting material includes polymers that have amine sites (i.e., aminopolymers) that capture $CO_2$ from a gas stream, preferably air. In preferred approaches, no inert support material is present in the material for capturing carbon dioxide from air; rather the unique crosslinked structure provides sufficient support for the intended application such that a support material is not needed. Accordingly, in such preferred approaches, there is no support material present within an outer periphery of the self-supporting structure (aside from the main material that is formed into a self-supporting structure). In one approach, the self-supporting structure has an x-y dimension of at least 1 mm. In one approach, the self-supporting structure has an x-y-z dimension of at least 1 mm.

FIG. 1 depicts a schematic drawing of a product 100, in accordance with one inventive aspect. As an option, the product 100 may be implemented in conjunction with features from any other embodiment listed herein, such as those described with reference to the other FIGS. Of course, however, such product 100 and others presented herein may be used in various applications and/or in permutations which may or may not be specifically described in the illustrative embodiments listed herein. Further, the product 100 presented herein may be used in any desired environment.

FIG. 1 illustrates a product 100 including an aminopolymer material 101 formed into a self-supporting structure 102. The aminopolymer material 101 includes crosslinked aminopolymers 112 having amine sites for the capture of $CO_2$ molecules. In some approaches of the product 100, no support material is present within an outer periphery of the self-supporting structure 102. For example, the product does not include a supporting material formed independently to the aminopolymer material. In a preferred approach, the physical characteristic of being a self-supporting structure is formed solely from the components of the resin (e.g., a functionalized aminopolymer, one or more co-monomers, etc.) as described herein.

In various approaches, the self-supporting structure 102 has an x-y dimension of at least 1 millimeter (mm). In one approach, the self-supporting structure 102 has an x-y-z dimension of at least 1 mm. In some approaches, the self-supporting structure 102 may be in the form of a 3D printed self-supporting structure 102. In one approach, the self-supporting structure may be in the form of a molded self-supporting structure. In other approaches, the self-supporting structure may be in the form of a sheet (not shown).

In various approaches, the self-supporting structure 102 may include a hierarchical pore structure having inter-material pores 104 for the flow of a gas stream (e.g., a source gas) through the self-supporting structure 102 and intra-material pores 106 within the aminopolymer material 101. To enable $CO_2$ to reach a maximum number of the amine sites for capture, the aminopolymer material 101 is preferably porous. As shown in the magnified view 110 of a portion of the self-supporting structure 102, a scanning electron microscope (SEM) image illustrates the aminopolymer material 101 having porous crosslinked aminopolymer 112 with intra-material pores 106 and submicron features 108 that may include ridges, protrusions, matrix, ligaments, etc.

Hierarchical pore networks that facilitate mass transfer throughout the structure to allow rapid $CO_2$ uptake may be formed by inclusion of porogens that may be removed during post-polymerization processing. Intra-material pores 106 may be formed by the addition of a porogen to the material prior to crosslinking that is removed after crosslinking, after formation of the structure, etc. In one approach, the aminopolymer material 101 may have an internal pore structure having a physical surface structure characteristic of a previously-present porogen around which the material was formed, e.g., by crosslinking. For example, the surfaces of the pores have a general texture and/or shape corresponding to the outer surface of the porogen. In some approaches, continuous channels are formed upon removal of the porogen, the surfaces of the channels corresponding to the outer shape of the porogen structure that resided there previously. In one approach, when the porogen is a liquid, illustrative physical surface structure characteristics remaining after the liquid is removed include nodules, strands, other similar features, etc. arising from the phase separation of the material from the solution upon crosslinking.

As shown in the schematic drawing of self-supporting structure 102, the hierarchical porosity may include intra-material pores 106 (e.g., intra-strand, intra-filament, etc.) and inter-material pores 104 (e.g., inter-strand, inter-filament, etc.). Intra-material pores 106 of the aminopolymer material 101 may have an average diameter $p_{im}$ in a range of about 100 nanometers to about 10 s of microns, though average diameters in some approaches may be larger or smaller, in the nanoscale (1 to 1000 nm) to micron (1 to 1000 micron) range. The average diameter $p_{im}$ of the intra-material pores 106 may be optimized to allow for accessibility of the amine functional groups to passing $CO_2$ molecules in the gas stream. In preferred approaches, intra-material pores having an average diameter $p_{im}$ in a range of 200 nanometers (nm) to 2 microns (μm) allow accessibility to amine sites of the material.

In various approaches, inter-material pores 104 may have an average diameter $p_m$ in the micron to millimeter or centimeter range. Larger inter-material pores 104 tend to be larger and formed by the fabrication process. For example, a predefined geometric designed 3D printed structure may create large inter-material pores 104 during printing. In preferred approaches, the inter-material pores 104 have an average diameter $p_m$ in a range of 100 microns to 10 millimeters (mm). The inter-material pores 104 have an average diameter $p_m$ tuned for optimal flow of the gas stream through the self-supporting structure.

In another example, fabrication of a flat sheet may include holes (e.g., punched out of the sheet) to form inter-material pores. In another example, a fabricated flat sheet may be rolled or arranged in a way such that inter-material pores are formed. In yet another example, a larger removable porogen may be added during fabrication. In another example, a structure of the material inside a mold may include inter-material pores. These techniques are by way of example only and are not meant to be limiting in any way.

In various approaches, the aminopolymer material formed into a self-supporting structure may include one or more co-monomers for improving mechanical, physical, chemical, etc. properties of the material and/or self-supporting structure. As described herein, the resin for forming the self-supporting structure may include one or more monomers in addition to the functionalized aminopolymer (i.e., co-monomers) for increasing the mechanical, physical, chemical, etc. properties of the self-supporting structure after crosslinking. The one or more co-monomers may be crosslinked with the functionalized aminopolymer in the self-supporting structure.

In some approaches, the aminopolymer material may include one or more co-monomers for improving mechanical properties of the self-supporting structure. In one approach, the material for capturing $CO_2$ may include one or more co-monomers for increasing the mechanical strength of the self-supporting structure. In one approach, the material may include one or more co-monomers for improving flexibility of the self-supporting structure. In another approach, the material may include co-monomers for improving the ductility of the self-supporting structure. In some approaches, the material may include one or more co-monomers for improving a combination of mechanical properties of the self-supporting structure.

In some approaches, the material may include one or more co-monomers for improving physical properties of the material. For example, the material may include one or more co-monomers for increasing mass transport of $CO_2$ through the material, for improving the thermal stability of the material, for improving the thermal conductivity of the material, for improving electrical conductivity of the material, etc. In some approaches, the material may include one or more co-monomers for improving a combination of physical properties.

In some approaches, the aminopolymer material may include one or more co-monomers for improving chemical properties of the aminopolymer material. For example, the aminopolymer material may include one or more co-monomers for improving association of $CO_2$ to an amine site, for improving uptake rate (i.e., kinetics) of $CO_2$ in the material, for improving the release rate of $CO_2$ from the material, improving chemical stability of the material, imparting new chemical properties, changing the hydrophobicity, etc. In some approaches, the material may include one or more co-monomers for improving a combination of chemical properties. In one approach, the aminopolymer material may include one or more co-monomers that improve a combination of mechanical, physical and/or chemical properties of the aminopolymer material formed as a self-supporting structure.

In some approaches, a supporting structure, housing, etc. of known type may be included in the final product, e.g., to reinforce the self-supporting structure of the aminopolymer material. For example, a screen may be provided on one or both sides of a sheet of the aminopolymer material, e.g., similar to the structure of an air filter for an HVAC system. In another example, an annular casing is provided like a frame around the material. In one example, the material may be incorporated into a housing with additional air flow directing elements. In another example, the material may be incorporated as an element in a larger multi-component unit, system, etc.

An Aminopolymer Having Functional Groups Amenable to Crosslinking

According to one inventive aspect, a functionalized aminopolymer may be synthesized for use in a resin for forming a self-supporting structure. In one approach, synthesis may include a chemical functionalization of a high-amine-content precursor polymer (aminopolymer), oligomer (amino oligomer), small molecule, etc. In one approach, a functionalized macromonomer may be configured for crosslinking to form a self-supporting polymer network. For example, polymerizable end groups such as (meth)acrylate end groups may be added to the liquid precursor aminopolymer to enable crosslinking.

In various approaches, the aminopolymers may be any aminopolymer with a desired concentration of amine sites, preferably with at least 10 mol amine per kg and may be more or less. The aminopolymers may include a liquid precursor aminopolymer having a high-amine-content. In some approaches, the aminopolymer may include a co-polymer. For example, the aminopolymer may be a block co-polymer. In another example, the aminopolymer may be a random co-polymer. In another example, the aminopolymer may be a co-polymer of multiple aminopolymers. In exemplary approaches, aminopolymers for functionalization may include one or more of the following: linear poly (ethylenimine), branched poly(ethylenimine) (PEI), linear poly(propylenimine), branched poly(propylenimine), poly (butylenimine), poly(pentylenimine), poly(vinylamine), poly(allylamine), etc. In one approach, the aminopolymer may include a combination of aminopolymers.

The aminopolymers may have molecular weight of about 100 Da to 1,000 kDa. Some of the aminopolymers, e.g., poly(ethylenimine), poly(vinylamine), poly(allylamine), etc., may be commercially available. Some of the aminopolymers may be synthesized using known techniques that would become apparent to one skilled in the art upon reading the present disclosure.

In preferred approaches, a functionalized aminopolymer may have at least one functional group amenable for crosslinking. The aminopolymers may be functionalized with a functional group that is capable of polymerization to allow for crosslinking of the aminopolymers to form a crosslinked, self-supporting material. For example, at least one functional group may include one or more of the following: an acrylate, a methacrylate, an acrylamide, a methacrylamide, an allyl, a vinyl, a vinyl ether, a vinylbenzyl, a vinyl phenyl, an alkyne, an azide, etc. Typically, the functional groups may be added to the ends of the aminopolymers. For some aminopolymers that are randomly branched (for example, aminopolymer 200 in FIG. 2A), the functional group may be added to ends of the branches of the aminopolymer. In some instances, an internal location of the aminopolymer may be functionalized with a functional group. In one approach, each aminopolymer molecule may have a single type of functional group. In another approach, each aminopolymer molecule may have a combination of different functional groups.

In one approach, an aminopolymer having a desired concentration of amine sites may be reacted with methacryloyl chloride to add the functional group methacrylamide to one or more sites on the aminopolymer. In another approach, an aminopolymer having a desired concentration of amine sites may be reacted with glycidyl methacrylate to add the functional group methacrylate to one or more sites on the aminopolymer.

Figures 2A, 2B, 2C:
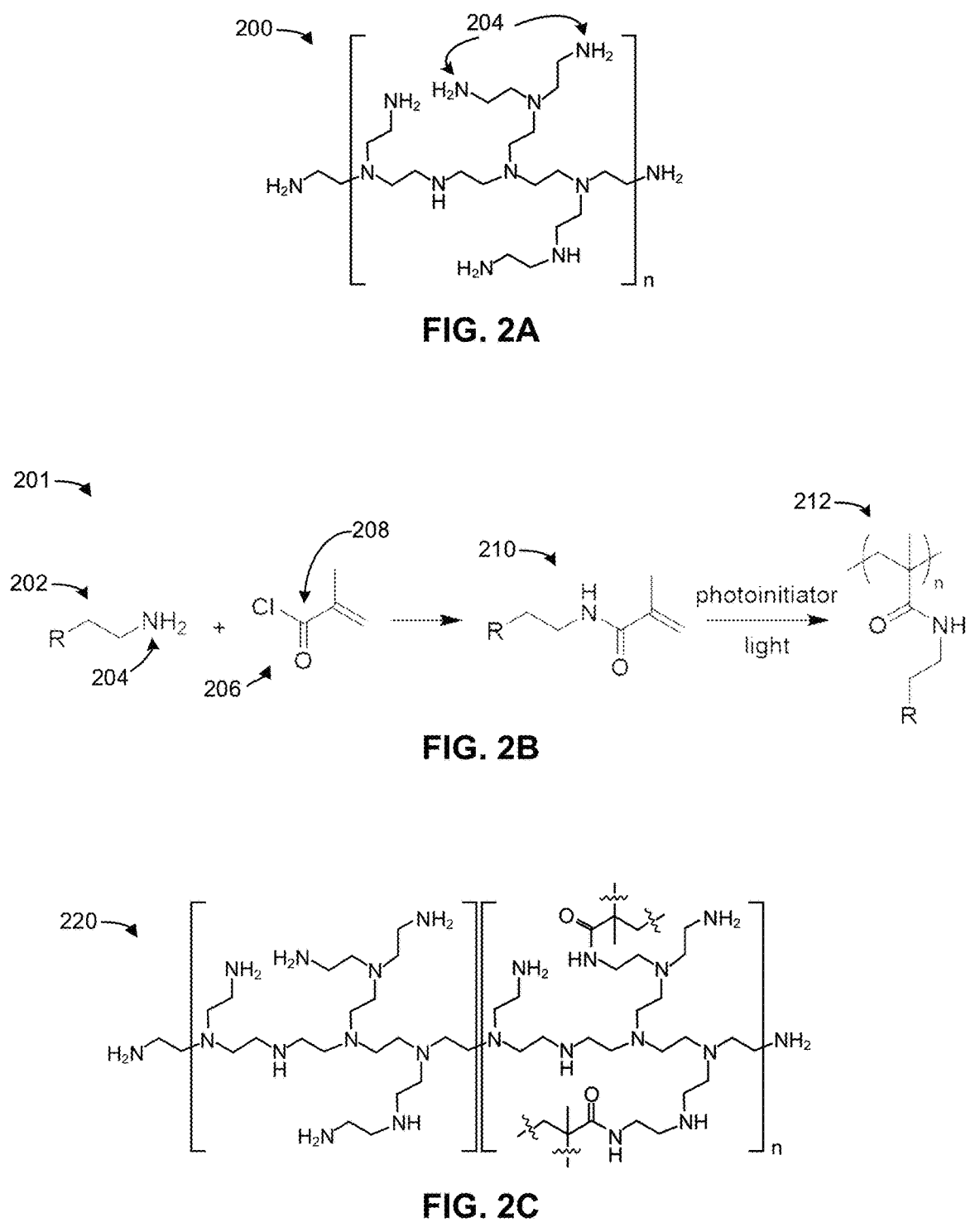

In some approaches, each aminopolymer molecule may have 1 to 3 functional groups amenable to crosslinking, though more or less functional groups may be present per molecule. For example, an aminopolymer molecule 200 as illustrated in FIG. 2A, may include 1 to 3 functional groups amenable to crosslinking (e.g., amine sites 204). In a preferred approach, the aminopolymer molecule may be functionalized with about 3 functional groups per molecule.

Without wishing to be bound by any theory, it is believed that over-functionalization of the aminopolymer may generate a powder form following crosslinking. For example, an average number of functional groups amenable to crosslinking per aminopolymer molecule being greater than 5 may generate a powder following crosslinking. However, in some cases, an aminopolymer molecule having fewer than 3 functional groups per molecule may result in the formation of a less cohesive material, the material being a viscous liquid, gel, etc. For example, after curing, the material may have structural characteristics of a swollen gel, and not a self-supporting solid.

As illustrated in FIG. 2B, one example of reaction 201 for functionalizing the polymers includes reacting a polymer 202 having at least one amine site 204 with methacryloyl chloride 206. The amine site 204 forms a bond with the carbonyl carbon 208 of the methacryloyl chloride molecule 206 thereby substituting with the Cl, such that the Cl is removed. A methacrylamide functionalized aminopolymer 210 is formed. The reaction may include an organic solvent. The reaction may include added heat and/or vacuum to facilitate the reaction and/or remove the organic solvent from the product. This reaction is by way of example only and not meant to be limiting in any way. Adding functional groups to the aminopolymers and polymerization of the functionalized aminopolymers may involve other reactions generally known to one skilled in the art, e.g., ring-opening, nucleophilic substitution, etc.

The reaction of the functionalization of the aminopolymer may take place in a liquid solution. In one approach, the reagents may be dissolved in an organic solvent for the functionalization reaction, e.g., tetrahydrofuran, dichloromethane, etc.

The methacrylamide functionalized aminopolymer 210 may be crosslinked to a sufficient extent to form a self-supporting material 212. The crosslinking may be initiated by UV irradiation, by heat, etc. The crosslinking causes the methacrylamide functional groups to react with one another, which crosslinks the functionalized aminopolymer into a self-supporting material.

FIG. 2C shows an example of the crosslinked aminopolymer material 220 following polymerization of functionalized aminopolymer formed in FIG. 2B. The aminopolymer material 220 may form a self-supporting adsorbent structure, according to one approach.

In one approach, a methacrylamide functionalized aminopolymer may result in an unstable resin. For example, the methacrylamide functional group may react with an amine, resulting in an undesirable type of crosslinking as well as the crosslinking occurring at uncontrolled times. For additive manufacturing techniques, a resin preferably has sufficient chemical stability such that it only crosslinks to form a self-supporting structure at a desired location and at a desired time. For example, a laser may be used to cause crosslinking when it shines upon a particular location within the resin.

Figure 3:
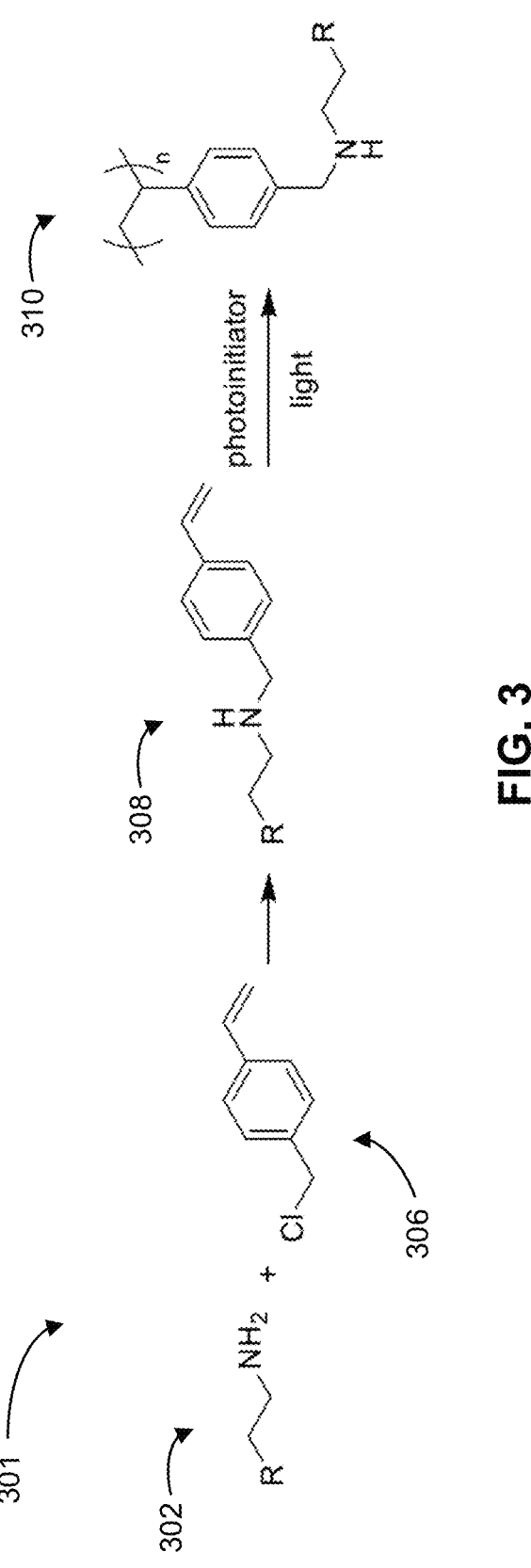
FIG. 3 depicts a schematic diagram of a proposed functionalization of an aminopolymer with a vinylbenzyl functional group, and the polymerization chemistry to form a self-supporting structure of the functionalized aminopolymer, according to one inventive aspect.

In another approach a preferable reaction 301, as illustrated in FIG. 3, includes functionalization of the aminopolymer 302 with a vinylbenzyl 306 functional group. An aminopolymer functionalized with a vinylbenzyl functional group 308 allows sufficient chemical stability of the resin to allow for formation of a self-standing structure. The vinylbenzyl functionalized aminopolymer 308 may be cured to form a self-supporting material 310 upon exposure to UV light. In preferred approaches, the functional group, such as a vinylbenzyl, etc. is present in each aminopolymer molecule in a ratio about 3:1 of functional group to aminopolymer molecule.

In some approaches, additional functional groups may be added to the aminopolymer. In some approaches, the organic solvent is removed following the functionalization reaction, e.g., via evaporation, solvent exchange, applied heat, vacuum, etc.

A Resin for Forming a Self-Supporting Aminopolymer Material

According to one inventive aspect, a liquid resin for forming a self-supporting structure from an aminopolymer material includes a functionalized aminopolymer having amine sites for capturing carbon dioxide molecules, a porogen, and a crosslinking initiator. As described herein each aminopolymer molecule has at least one functional group amenable to crosslinking. In various approaches, an average number of functional groups per aminopolymer molecule may be about 3, though more or less functional groups may be present per molecule.

In preferred approaches, a crosslinking initiator (e.g., crosslinking agent, polymerization initiator, etc.) is employed to assist in crosslinking the functionalized aminopolymer. In one approach, a UV polymerization initiator is employed. In one approach a thermal polymerization initiator is employed.

In one approach, the resin may include combining one or multiple porogens with the functionalized aminopolymer in the resin. The porogen is preferably present in the resin prior to crosslinking the material.

In various approaches, the porogen may be a material that can be removed following formation of the structure, for example, a solid, a liquid, a gas, etc. In another approach, the porogen may be a material that decomposes under the same conditions that cause crosslinking to form a gaseous product that generates pores.

Porogens can be anything that takes up space during the crosslinking step and can be removed from the polymerized material. Examples of porogens may include organic solvents, e.g., dichloromethane (DCM), dimethylformamide (DMF), water, etc.; small molecule liquids, e.g., poly(ethylene glycol) (PEG); large polymers, e.g., poly(vinyl alcohol) (PVA), poly(ethylene oxide) (PEO), poly(vinylpyrrolidone) (PVP); etc. In some approaches, porogens may include inorganic salts, inorganic liquids, etc. Examples of gaseous porogens include nitrogen, carbon dioxide, hydrogen, etc. Examples of porogen materials that decompose during crosslinking are chemical blowing agents such as azodicarbonamide, benzylsulfonyl hydrazide, and other compounds that decompose to form gases such as nitrogen, carbon dioxide, carbon monoxide, ammonia, hydrogen, etc.

The amount of porogen is preferably present at a concentration sufficient to form continuous intra-material pores through the self-supporting structure. In one approach, the porogen is present in an effective amount to form a porosity of the structure of greater than about 10 vol. % to 90 vol. % void space of the final structure. Ideally, the porogen is present in an effective amount to provide optimal surface area and intra-material pore diameter for $CO_2$ to access the amine sites while allowing enough material to maintain an appropriate volumetric density of amine sites.

In one approach, the resin includes one or multiple co-monomers that are retained in the material after formation of the self-supporting structure. The co-monomer(s) may be included in an effective amount for any purpose, such as for increasing a mechanical strength of the self-supporting structure. For example, the co-monomer may be an additional crosslinking component. The co-monomer(s) may be included for improving mechanical, physical, chemical, etc. properties of the material. For example, a co-monomer may improve a physical property of the aminopolymer material such as mass transport of $CO_2$ through the material, thermal stability, thermal conductivity, electrical conductivity, etc. In another example, a co-monomer may improve a chemical property of the aminopolymer material such as association of $CO_2$ to an amine site, uptake quantity (e.g., capacity) of $CO_2$, uptake rate (e.g., kinetics) of $CO_2$, chemical stability, etc.

In various approaches, the co-monomers may be functionalized monomers. In one approach, the one or more co-monomers may be crosslinked to the $CO_2$-capturing polymers. In another approach, the one or more co-monomers may itself be a polymer. In one approach, resin includes a mixture of the functionalized aminopolymer and one or multiple co-monomers. In one approach, the co-monomers may include one or more amines. In another approach, co-monomers may not include amines. In one approach, the co-monomer included in the composition has the same or different functionalized ends as the functionalized aminopolymer.

The co-monomers may be included to change a physical property of the final material. For example, the co-monomer may be a polyethylene glycol diacrylate, poly(vinyl alcohol) diacrylate, acrylate- or methacrylate-functionalized poly(siloxane), acrylate-functionalized fluoropolymer, etc., to affect the hydrophilicity/hydrophobicity of the material and affect properties such as $CO_2$ mass transport or chemical and thermal stability.

In some approaches, co-monomers may be included to enhance mechanical stability and other properties of the structure. For example, co-monomers may include bisphenol A dimethacrylate, 1,4-phenylene diacrylate, 1,4-phenylene dimethacrylate, etc., may be included to add rigidity to the structure. The co-monomers may be available commercially.

In one approach, a small percentage of co-monomers may be included to improve mechanical, physical, chemical, etc. properties of the resultant material, for example, up to 25 wt. % of total material may include co-monomers. In one approach, the material may include a co-monomer that enhances rigidity of the structure, a co-monomer that enhances polar functionality to help with $CO_2$ mass transport, a co-monomer that affects hydrophobicity or hydrophilicity of the material, etc.

Fabrication of a Porous Aminopolymer Material Formed as a Self-Supporting Structure Techniques for fabrication of the self-supporting material for carbon dioxide capture with larger (than powder) peripheral sizes, in accordance with various approaches described herein below, enables fabrication of monoliths of the self-supporting structure in a variety of shapes and sizes.

FIG. 4 shows a method 400 for forming a self-supporting structure for capturing carbon dioxide, in accordance with one inventive aspect. As an option, the present method 400 may be implemented to devices such as those shown in the other FIGS. described herein. Of course, however, this method 400 and others presented herein may be used to provide applications which may or may not be related to the illustrative aspects listed herein. Further, the methods presented herein may be carried out in any desired environment. Moreover, more, or less operations than those shown in FIG. 4 may be included in method 400, according to various inventive aspects. It should also be noted that any of the aforementioned features may be used in any of the approaches described in accordance with the various methods.

Operation 402 of method 400 includes forming a structure using a liquid resin. The resin may include a functionalized aminopolymer having amine sites for capturing $CO_2$ molecules from a source gas and at least one functional group amenable to crosslinking. In various approaches, the functionalized polymer of the resin may be synthesized as described herein by functionalizing aminopolymers (e.g., polymers having amine sites for capturing $CO_2$) with functional groups that are amenable for crosslinking. In a preferred approach, the functionalized aminopolymers are capable of capturing $CO_2$ from air.

In some approaches, the method includes combining a porogen with the resin prior to forming the structure. The resin may include one or multiple porogens that may occupy space in the aminopolymer material during formation of the structure and the crosslinking of the aminopolymer material.

In some approaches, the method includes combining a co-monomer with the resin prior to forming the structure. As described herein, the co-monomer may be included in the resin for increasing a mechanical property (e.g., strength) of the structure, improving the physical and chemical properties of the material, etc. after crosslinking. In one approach, the one or more co-monomers may be configured to crosslink with the functionalized aminopolymer.

Operation 404 of method 400 includes causing crosslinking of the functionalized aminopolymers to form the aminopolymer material having amine site for capturing $CO_2$ into the self-supporting structure. Any suitable crosslinking technique may be used and may be selected depending on the crosslinking agent for initiating the crosslinking of the polymer. In some approaches, the crosslinking may be initiated by exposure to ultraviolet (UV) light. In other approaches, the crosslinking may be initiated by thermal cure, e.g., applying heat. The crosslinking may be tuned to correspond to how many functional groups are added on average to the amine-dense polymer. For example, crosslinking may occur between individual functional groups, between functional group of different chains, etc.

In some approaches, operation 404 may include more than one crosslinking method for curing the aminopolymer material to form a self-supporting structure. For example, crosslinking the functionalized aminopolymer may include an initial fast UV cure followed by a thermal post cure to fully solidify the aminopolymer material to form a self-supporting structure.

In some approaches, crosslinking may take place in an essentially oxygen free environment, especially in approaches where oxygen may inhibit the polymerization. In one approach, a light-based 3D printing technique, such as stereolithography, digital light projection, projection microstereolithography, computed axial lithography, etc., may be used for polymerization.

Crosslinking of the aminopolymers, and co-monomers if applicable, may be tuned to an effective extent to form a self-supporting structure. In some approaches, a crosslinking initiator (e.g., a polymerization initiator) may be included in the total composition of the resin. In one approach, a polymerization initiator may be present in an effective amount to initiate crosslinking of the functionalized aminopolymer and co-monomers. In some approaches, a self-supporting structure may be formed by including about 10 wt. % or less of polymerization initiator relative to a total composition of the resin (e.g., the functionalized aminopolymer, the co-monomer(s), the porogen(s), the initiator, etc.) before crosslinking. In preferred approaches, about 1 wt. % or less of polymerization initiator relative to the total composition of resin before crosslinking will form a self-supporting structure.

For UV crosslinking, a preferred composition of the material prior to crosslinking includes about 30 wt. % to about 60 wt. % functionalized aminopolymer, 40-70 wt. % porogen, and 1 wt. % crosslinking initiator. In one approach, the portion of functionalized aminopolymer includes the co-monomer(s), e.g., about 30 wt. % to about-60 wt. % functionalized aminopolymer+co-monomer.

As indicated above, following operation 404, the added porogen may be removed from the crosslinked structure for creating a defined porosity in the aminopolymer material of the self-supporting structure, e.g., as defined by the porogen. Removing the porogen may include methods generally known to those skilled in the art, for example, solvent exchange to wash out the porogen, evaporation of volatile porogens, heat, etc.

Preferably the porogens are not in the final structure; however, some residual porogens may remain. Increased porosity of the adsorbent structure allows the CO$_2$ to access more amine sites on the adsorbent structure. Moreover, increased porosity of the structure, formed by the porogens, increases the surface area of the structure exposed to the CO$_2$ gas.

In preferred approaches, no support material is present within the outer periphery of the self-supporting structure formed from the method as described. For example, forming the aminopolymer material as a self-supporting structure does not include adding any separately formed, obtained, synthesized, etc. support material to the self-supporting structure.

The approaches described herein are amenable to additive manufacturing, thereby allowing the final structure to be fabricated as a free-standing structure (e.g., a self-supporting structure). In one approach, the self-supporting structure may be formed into a sheet during the crosslinking of the functionalized aminopolymer, for example, a cloth formed in a roll-to-roll process. For example, the sheet can be rolled up, pleated, etc. In yet another approach, the self-supporting structure may have a peripheral shape corresponding to a mold in which the material was formed.

In another approach, the self-supporting structure may be in the form of a 3D printed structure. In one approach, the method may include 3D printing the functionalized aminopolymers prior to and/or concurrently with the crosslinking. In preferred approaches, the method may include forming a 3D printed structure via light based additive manufacturing techniques. In one approach, the method may include a stereolithography process to fabricate other 3D geometries, such as structure-optimized adsorbent packings, monoliths, etc. For example, the packings, monoliths, etc. may be in the shape of an octet truss, a gyroid, a log pile lattice, etc. In other approaches, an extrusion-based printing technique may be used to form the self-supporting structure with the functionalized aminopolymer resin, and a curing step would follow the printing to crosslink the resin into a self-supporting material.

Method of Using an Aminopolymer Material Formed as a Self-Supporting Structure

FIG. 5 shows a method 500 for using an aminopolymer material formed as a self-supporting structure for capturing CO$_2$ from a source gas, in accordance with one inventive aspect. As an option, the present method 500 may be implemented to use structures such as those shown in the other FIGS. described herein. Of course, however, this method 500 and others presented herein may include using structures for a wide variety of applications and/or purposes which may or may not be related to the illustrative approaches listed herein. Further, the methods presented herein may be carried out in any desired environment. Moreover, more or less operations than those shown in FIG. 5 may be included in method 500, according to inventive aspects. It should also be noted that any of the aforementioned features may be used in any of the approaches described in accordance with the various methods.

A method as described in FIG. 5, includes a self-supporting crosslinked aminopolymer structure that captures CO$_2$ from a CO$_2$-containing source gas by reaction of the CO$_2$ with the amine groups of the aminopolymer and/or adsorption on the surfaces of the structure. Operation 502 includes contacting a CO$_2$-containing source gas with a porous aminopolymer material having amine sites for capturing CO$_2$ molecules. The porous aminopolymer material is formed as a self-supporting structure. The source gas may be a gas stream of a mixture of gases, e.g., air, flue gas, etc.

A reaction of the adsorption of CO$_2$ by the amine sites of the self-supporting structure, for example as formed from the crosslinked aminopolymer material 220 of FIG. 2C or crosslinked aminopolymer material 310 of FIG. 3, is represented in Equation 1. In the absence of moisture, CO$_2$ molecules react with amine sites in an exothermic chemical reaction that forms an ammonium carbamate.

$$2RNH_2 + CO_2 \Leftrightarrow RNHCO_2^- + RNH_2^+ + \Delta H \qquad \text{Equation 1}$$

In one approach in which the source gas is air, the CO$_2$-depleted air that has passed through the inter-material pores of the porous aminopolymer material may be used as CO$_2$-clean air, such that the CO$_2$ molecules of the incoming air have been adsorbed at the amine sites of the aminopolymer material. In another approach in which the source gas is combustion flue gas, CO$_2$-depleted flue gas may be used as CO$_2$-clean flue gas.

Operation 504 of method 500 includes heating porous aminopolymer material to a pre-defined temperature for desorbing the CO$_2$ molecules from the aminopolymer material. As shown in Equation 1, application of heat, $\Delta H$, alone or with vacuum, reverses the reaction thereby allowing the release of the CO$_2$ molecule from the amine group. In one approach, the method may include applying a vacuum for assisting in desorption of the CO$_2$ molecules from the porous aminopolymer material. In one approach, the method may include applying steam for assisting in desorption of the carbon dioxide molecules from the porous aminopolymer material.

In some approaches, a pre-defined temperature for releasing the CO$_2$ may be in a range of 60° C. to about 120° C. In some approaches, application of a vacuum with the heating allows a lower temperature, in some cases lower than 60° C., to release the CO$_2$ molecules and regenerate the amine sites.

Operation 506 of method 500 includes collecting the CO$_2$ gas. After capturing, the adsorbed CO$_2$ may be released preferably as a pure stream that can be collected and used in a different process, sequestered, stored, etc. The CO$_2$ may be removed from the self-supporting structure having a crosslinked aminopolymer by heating the CO$_2$-adsorbed structure, and/or applying a vacuum to the CO$_2$-adsorbed structure, and/or applying steam to the CO$_2$-adsorbed structure.

In some approaches, the aminopolymer material as a self-supporting structure may be re-used for depleting CO$_2$ from a new $CO_2$-containing source gas such that the amine sites of the aminopolymer material having released $CO_2$ molecules become available for incoming $CO_2$ molecules from a new source gas. The released $CO_2$ may then be concentrated for use in a different application.

Any of the methods, systems, devices, etc. described above, taken individually or in combination, in whole or in part, may be included in or used to make one or more systems, structures, etc. In addition, any of the features presented herein may be combined in any combination to create various inventive aspects, any of which fall within the scope of the present invention.

Experiments

Figure 6:
FIG. 6 is an image of a self-supporting structure of crosslinked aminopolymer material, according to one inventive concept.

FIG. 6 depicts an image of an aminopolymer material formed as a self-supporting structure.

Figure 7:
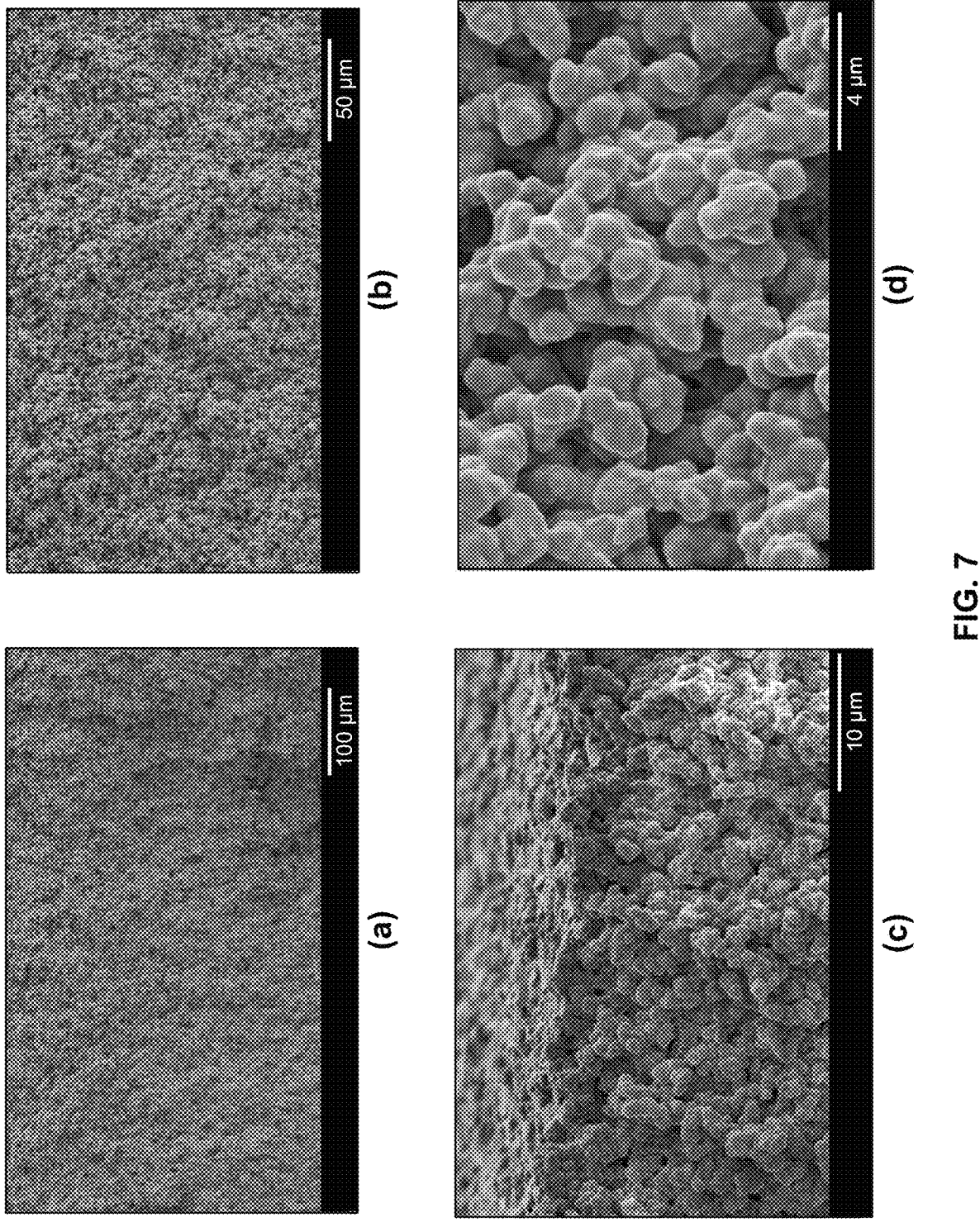
FIG. 7 is a series of scanning electron microscopy (SEM) images of porous aminopolymer material formed as a self-supporting structure, according to one inventive concept. Part (a) is an image of low magnification with a scale bar of 100 μm, part (b) is an image of a higher magnification with a scale bar of 50 μm, part (c) is an image of higher magnification with a scale bar of 10 µm, and part (d) is an image of higher magnification with a scale bar of 4 µm.

FIG. 7 is a series of SEM images of a porous aminopolymer material formed as a self-supporting structure. The porous aminopolymer material was cast as a flat disc. Images were captured of the crosslinked aminopolymer material at different magnifications. Part (a) is an image of a field of the porous aminopolymer material at low magnification having a scale bar of 100 μm, part (b) is an image of a field of the porous aminopolymer material at a higher magnification with a scale bar of 50 μm, part (c) is an image of the porous aminopolymer material at a higher magnification with a scale bar of 10 μm, and part (d) is an image of the porous aminopolymer material at a higher magnification with a scale bar of 4 μm. Each image captures the porosity of the aminopolymer material that allows accessibility of $CO_2$ molecules to the amine sites of the aminopolymer material.

Uses

In various inventive aspects, products described herein are useful for capture of $CO_2$ from gas streams ranging from dilute (air, coal combustion flue gas, natural gas combustion flue gas, etc.) to concentrated (biogas, fermentation off-gas, etc.). Moreover, products described herein are useful for capturing $CO_2$ for sequestration, utilization, scrubbing $CO_2$ out of a gas stream to purify the gas stream, etc.

The product may be used in a conventional manner, in similar ways that conventional supported solid capture products are used. Likewise, the product may be regenerated in similar ways that conventional supported solid capture products are regenerated.

It will be clear that the various features of the foregoing systems and/or methodologies may be combined in any way, creating a plurality of combinations from the descriptions presented above.

While various inventive aspects have been described above, it should be understood that they have been presented by way of example only, and not limitation. Thus, the breadth and scope of an aspect of the present invention should not be limited by any of the above-described exemplary approaches but should be defined only in accordance with the following claims and their equivalents.

What is claimed is:

1. A product, comprising:

an aminopolymer material formed into a self-supporting structure, the aminopolymer material comprising crosslinked aminopolymers having amine sites for the capture of carbon dioxide molecules, wherein the aminopolymer material comprises intra-material pores having an average diameter in a range of about 100 nanometers to 1000 microns.

2. The product as recited in claim 1, wherein no support material is present within an outer periphery of the self-supporting structure.

3. The product as recited in claim 1, wherein the self-supporting structure has an x-y dimension of at least 1 millimeter.

4. The product as recited in claim 1, wherein the self-supporting structure is in a form of a sheet.

5. The product as recited in claim 1, wherein the aminopolymer material has an internal pore structure having a physical surface structure characteristic of a previously-present porogen around which the aminopolymer material was formed.

6. The product as recited in claim 1, comprising a co-monomer in the aminopolymer material, the co-monomer configured to improve a mechanical property of the self-supporting structure, the mechanical property being selected from the group consisting of: mechanical strength, flexibility, ductility, and a combination thereof.

7. The product as recited in claim 1, comprising a co-monomer in the aminopolymer material, the co-monomer configured to improve a physical property of the aminopolymer material, the physical property selected from the group consisting of: thermal stability, mass transport of carbon dioxide through the aminopolymer material, thermal conductivity, electrical conductivity, and a combination thereof.

8. The product as recited in claim 1, comprising a co-monomer in the aminopolymer material, the co-monomer configured to improve a chemical property of the aminopolymer material, the chemical property selected from the group consisting of: chemical stability, association of carbon dioxide to an amine site, uptake quantity of carbon dioxide in the material, kinetics of carbon dioxide uptake in the material, kinetics of carbon dioxide release from the material, and a combination thereof.

9. The product as recited in claim 1, wherein the intra-material pores have an average diameter in a range of about 200 nanometers to about 2 microns.

10. The product as recited in claim 1, wherein the self-supporting structure is in a form of a 3D printed structure.

11. The product as recited in claim 10, wherein the 3D printed structure comprises inter-material pores.

12. The product as recited in claim 11, wherein the inter-material pores have an average diameter in a range of about 100 microns to about 10 millimeters.

13. A method of forming the self-supporting structure as recited in claim 1, the method comprising:

forming a structure using a resin, the resin comprising a functionalized aminopolymer having amine sites for capturing carbon dioxide molecules, a porogen, and a crosslinking initiator, wherein each aminopolymer molecule has greater than one functional group amenable to crosslinking, wherein each aminopolymer molecule has up to five of the functional groups; and causing crosslinking of the functionalized aminopolymer to form the aminopolymer material having amine sites for capturing carbon dioxide into the self-supporting structure.

14. The method as recited in claim 13, comprising combining the porogen with the resin prior to forming the structure, and removing the porogen after the crosslinking for creating a defined porosity in the aminopolymer material.

15. The method as recited in claim 13, wherein the functionalized aminopolymer includes an aminopolymer selected from the group consisting of: linear poly(ethylen-imine), branched poly(ethylenimine), linear poly(propylen-imine), branched poly(propylenimine), poly(butylenimine), poly(pentylenimine), poly(vinylamine), poly(allylamine), and a combination thereof.

16. The method as recited in claim 13, wherein the greater than one functional group amenable to crosslinking is selected from the group consisting of: an acrylate, a meth-acrylate, an acrylamide, a methacrylamide, an allyl, a vinyl, a vinyl ether, a vinylbenzyl, a vinyl phenyl, an alkyne, and an azide.

\* \* \* \* \*